Nov. 12, 1968 D. W. GROOM 3,410,986
ELECTRIC STEAM GENERATOR
Filed March 15, 1965 2 Sheets-Sheet 1
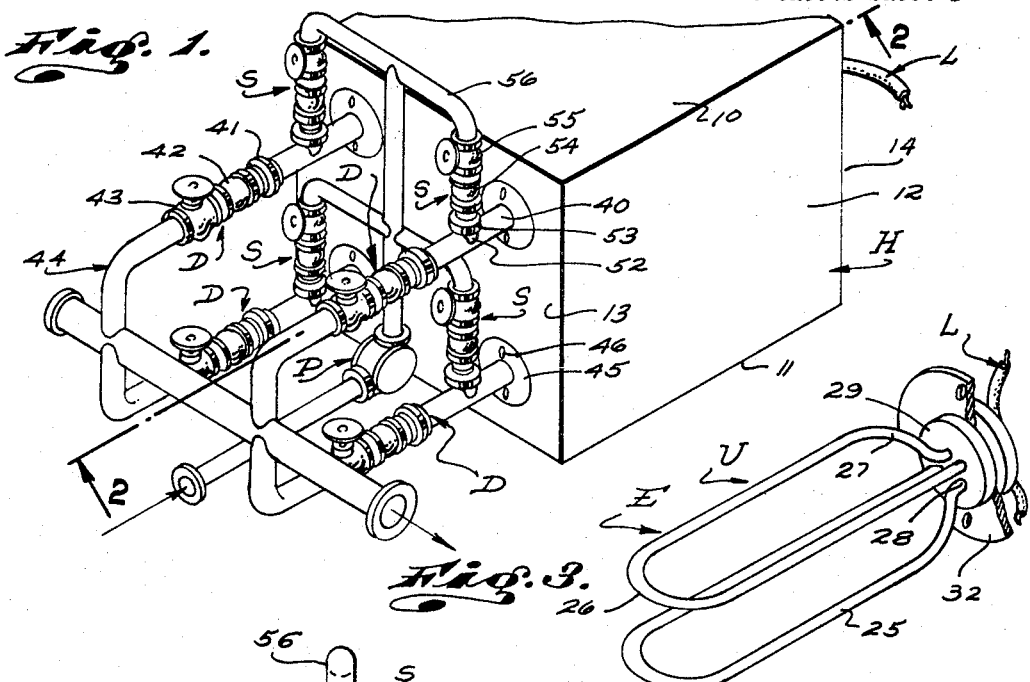
Inventor
David W. Groom
By
George
Attorney

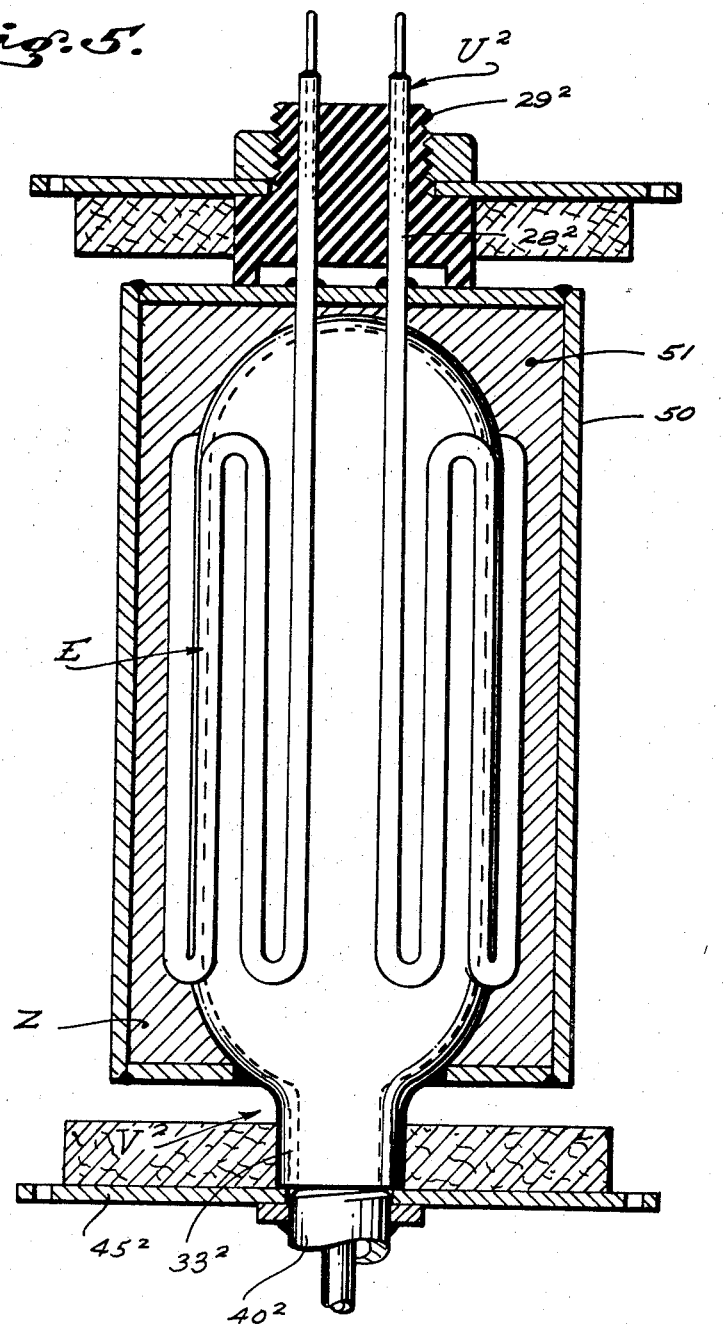

United States Patent Office 3,410,986
Patented Nov. 12, 1968

3,410,986
ELECTRIC STEAM GENERATOR
David W. Groom, Hemet, Calif. (2262 E. Lake Sammamish Road SE., Issaquah, Wash. 98027)
Filed Mar. 15, 1965, Ser. No. 439,715
15 Claims. (Cl. 219—271)

ABSTRACT OF THE DISCLOSURE

A steam generator comprising an insulated housing with a front wall and defining a chamber, a plurality of steam vessels with forwardly projecting necks and lead filled jackets arranged within the chamber, resistance heater units extending into the jackets and through the lead therein, steam conducting nipples connected with the vessel necks and with a steam manifold, shut-off valve means accessible at the exterior of the front wall controlling the flow of steam through the nipples and into the steam manifold, a water main, elongate wands extending through the nipples into the vessels and having nozzles to spray water in the rear of the vessels and manually operable valve means accessible at the exterior of said front wall and controlling the flow of water from the main into the vessels.

---

This invention has to do with a steam generator and is more particularly concerned with a novel electric powered steam generator construction.

The prior art has provided several steam generators or apparatus employing electric resistance heaters. These generators have not met with commercial success as they have been extremely inefficient.

Those engaged in the art of steam generation have, as a result of the inefficiency of prior efforts to provide electrically heated steam generators, accepted as a general rule that electrically heated steam generators are too inefficient and costly to operate to be commercially practical or feasible.

Another major limitation encountered in the use of electric resistance heaters in steam generators resides in the fact that resistance heaters function efficiently at a single, designed temperature. As a result, electrically heated steam generators provided by the prior art are substantially inflexible or fixed with respect to their output.

An object of my invention is to provide an effective and efficient electrically heated steam generator.

Another object of the present invention is to provide a steam generator of the character referred to which is versatile and readily adapted to deliver a wide range of steam output.

Yet another object of this invention is to provide a steam generator of the character referred to which is capable of generating small or large volumes of steam, instantly and at extremely high pressures.

A feature of this invention is to provide a steam generator including two or more metal steam generating vessels having resistance heaters at and about their exteriors and arranged only within a closed insulated chamber whereby the vessels are heated by the heaters and the chamber in which the vessels are arranged is heated so that substantially all of the heat generated is contained and available for the generation of steam within the vessels.

Another object and feature of the present invention is to provide a plurality of like steam generating vessels and like resistance heater units, each of which is designed whereby the capacity of the vessel and the heaters are in balance for maximum efficiency for the generation of steam.

Still another object of the present invention is to provide a structure of the character referred to which includes means for introducing water into the vessels for substantially uniform distribution therein and means for exhausting steam from the vessels, which means is related to the means for introducing water into the vessels in such a manner as to effectively preheat the water before it is released in the vessels.

Another object and feature of my invention is to provide a novel heater construction for each vessel which serves to releasably support and carry the vessel.

It is an object of the present invention to provide a construction of the character referred to which is easy and economical to manufacture and which is highly effective, dependable and economic in operation.

The above and other objects and features of my invention will be fully understood and will become apparent from the following detailed description of typical preferred forms and applications of my invention, throughout which description reference is made to the accompanying drawings, in which:

FIGURE 1 is an isometric view of my new steam generator;

FIGURE 2 is an enlarged detailed sectional view taken as indicated by line 2—2 on FIGURE 1;

FIGURE 3 is an isometric view of a heater unit as provided by the present invention;

FIGURE 4 is an isometric view of another form of heater unit; and

FIGURE 5 is an enlarged, detailed, sectional view showing another form of my invention.

The steam generator that I provide involves generally an insulated housing H defining a chamber X, a plurality of similar resistance type heater units U releasably carried by the housing H to occur within the chamber X, a steam vessel V releasably engaged and carried by each heater unit U, discharge means D related to the vessel V to conduct steam generated therein, therefrom, and, water supply means S related to the means D and the vessels V to deliver water into the vessels V.

The housing H is a unitary box-like structure having imperforate top, bottom and side walls 10, 11 and 12, and perforate front and rear walls 13 and 14. The several walls are preferably established of sheet metal.

The inside of the housing H is provided with a lining 15 of heat insulating material, such as asbestos fiber matting. The inside surfaces of the insulating material are covered or provided with a skin 16 of corrugated stainless steel or aluminum, having a polished reflective inner surface. The corrugations are preferably such that they define inwardly disposed, longitudinally extending concave reflecting surfaces which serve to direct radiant heat issuing from the heaters back towards the heaters and the vessels.

The front wall 13 of the housing is provided with a plurality access opening 17 of substantial size and of suitable configuration to freely receive or accommodate the vessels. V. The opening 17 is in predetermined spaced relationship and corresponds in number with the maximum number of vessels that it is contemplated will be required to generate the desired maximum volume of steam.

The lining 15 and skin 16 related to the front wall are provided with apertures 18 and 19 which register with the opening 17.

The rear wall 14 of the housing H is provided with access openings 20 and the lining and skin related thereto are provided with apertures 21 and 22 which are equal in number and are arranged in axial alignment with the openings 17 in the front wall.

Parts related to the heater units U and the vessels V serve to close and seal the access openings in the front and rear walls, as will hereinafter be described.

It will be apparent from the foregoing that the housing H, being insulated and being closed and sealed, establishes a heat sink and that the heat generated by the heater units in the chamber X is only free to escape through the vessels V, and then only by heat transfer resulting in the conversion of water into steam therein.

The several heater units U are alike and as a result, are standard, interchangeable and easily replaceable.

Each unit includes a pair of like, elongate, split-loop insulated resistance heating elements E having straight parallel, horizontally disposed rail portions 25, a rounded or radiused front end portion 26 extending between the forward ends of the rail portions and a rounded or radiused rear portion 27 at and between the rear ends of the rail portions. The rear portion 27 is split adjacent the central longitudinal axis of the element and is provided at its opposite ends with longitudinally rearwardly extending extensions 28 which project rearwardly through a suitable carrier block or body 29. The terminal ends of the extensions are provided with terminal posts 30 which are engaged by suitable electrical couplers 31 on a suitable power line L.

The carrier block or body 29 is provided with a flat, radially extending mounting and/or closure plate 32, which plate overlies the access opening 20 in the rear wall 14 of the body with which the heater unit is related and overlies and establishes flat bearing and sealing engagement on the outside surface of said rear wall about said opening. The plate and the rear wall are provided with registering fastener receiving openings in which suitable screw fasteners 33 are engaged to releasably secure the unit to the housing.

The plate is provided with a plug of insulating material on its forward or inner surface and about the body, which plug enters the aperture 21 in the lining and prevents the loss of heat through the aperture 21 and access opening 20. The elements E are that type of heater which includes a metal sheath, a resistance wire extending longitudinally through the metal sheath and a body of insulating material in the sheath and about the wire to maintain the wire in insulated spaced relationship from the sheath and work with which the heater may come in contact with.

In the instant case, due to the longitudinal extent of the elements E and the manner in which they are supported by the blocks or bodies, they are somewhat resilient and their forward ends can be sprung radially outwardly relative to the longitudinal axis of the units a sufficient extent to accommodate the vessels V, as will hereinafter be described.

The vessels V are like elongate, horizontally disposed steel cylinders having straight cylindrical side walls 30' and spirical front and rear ends 31' and 32'. The vessels are arranged in axial alignment with the access openings in the housing H and with the central axes of the air related heater units U. The forward ends 31' of the vessels V are provided with central, internally threaded, axially forwardly projecting necks 33.

In practice, steel compressed gas flasks or cylinders, such as oxygen cylinders, are or can be advantageously employed as vessels in carrying out my invention.

In practice, the pair of elements E of each heater unit U are shaped and proportioned so that the rail portions and the rounded end portions of the elements establish bearing, seated engagement with the sides and ends of the vessels and serve to embrace and support the vessels within the chamber X of the housing H.

It will be apparent that the forward ends of the elements can be advantageously sprung, as set forth above, to permit axial rearward shifting of the vessels V into engagement with the units U and axial forward shifting of the vessels V out of engagement with the units as circumstances require.

The access openings 17 in the front wall of the housing H and their related apertures in the lining 15 and skin 16 are of such size and shape to freely receive the vessels V for engagement and removable of the vessels in the chambers X and with the units U.

The steam discharge means D includes an elongate horizontally disposed nipple 40 arranged in axial alignment with each vessel V and having its rear end threadedly engaged and sealed in the neck 33 of the vessel.

The nipples project axially forwardly through the access openings 17 and terminate at the exterior of the housing H.

A union 41 is provided at the outer end of the nipples and releasably secures the nipples and the vessels with check valves 42, which valves permit free flow of steam from and out of the vessels and prevents a rearward or reverse flow of steam back into the vessels.

The outlet side of the check valves 42 are connected with the inlet side of manually operable shut-off valves 43. The outlet sides of the valves 43 connect with a manifold or steam delivery line 44.

With this relationship of parts, it will be apparent that each of the several vessels V can be selectively put into and taken out of operation for the purpose of changing the volume of steam being generated and/or for the purpose of repair, as circumstances require or as desired.

An apertured closure and/or mounting plate 45 is engaged about the nipple and is held in clamped engagement against the adjacent end of the vessel neck 33 by a clamp nut threadedly engaged on the nipple. The plate overlies the access opening 17 with which the vessel is related and the front surface of the front wall 13 of the housing about said access opening.

The plate 45 and the front wall are provided with openings to receive the screw fasteners 46 to releasably secure the vessels and their related hardware to and with the housing.

The plate 45 is provided with an apertured plug 47 of insulating material which enters and closes the aperture 18 in the lining adjacent the access opening.

The water supply means S includes an elongate horizontally disposed tubular wand 50 extending longitudinally along the central longitudinal axis of each vessel V, from the rear portion of the chamber Y therein, through the neck 33 thereof and thence forwardly and outwardly through the nipple 40 related to the vessel. The rear end of the wand is provided with a spray nozzle 51. The forward end of the wand is provided with a laterally turned neck or riser 52 which projects through the side of the nipple, adjacent the forward outer end thereof. The riser is suitably sealed and the wand is fixed with and to the nipple, as by welding.

The outer end of the riser is provided with a union 53 which couples the riser to the outlet side of a check valve 54. The inlet side of the valve 54 connects with the outlet side of the manually operable shut-off valve 55, which valve is connected with a water supply main M provided to deliver water to each of the several means S.

In practice, a high pressure pump P can be provided to deliver water at a desired operating pressure, into the main M, where the source of water is under insufficient head.

With the means S set forth above, it will be apparent that the several vessels V can be supplied with water and put into or taken out of service, as desired and as circumstances require.

It will be further apparent that by putting the several vessels into and out of operation, the output of the construction can be increased or decreased upon demand and as circumstances require.

Since the vessels V are within the chamber X and all of the units U are in operation at all times, no time is required to allow or permit the vessels to heat, when their output is demanded.

It will be apparent that the wands 50 extending longitudinally through the heated vessels are themselves heated and serve to effectively preheat the water flowing therethrough, before it is discharged into the chambers Y of the vessels, through the nozzles.

Still further, it will be apparent that by spraying the water into the rear ends of the chambers Y of the vessels V, remote from the outlets or necks 33 thereof, the water and/or steam must travel the entire longitudinal extent of the vessels and in intimate contact with the heated walls thereof, thereby taking advantage of the full or maximum heating effect that can be obtained and also permitting any blowby of water, through the necks 33 and into the means D.

In the form of the invention illustrated in FIGURE 4 of the drawings, the heater elements E′, is in the form of a band type electric heater engaged about a forwardly opening receiver tube 70 fixed to and projecting forwardly from the mounting plate 32″.

It will be apparent that this second form of heater unit could be advantageously employed without departing from the spirit of the invention and in no way affects the remainder of the construction.

With the present invention, it will be apparent that all of the vessels V, in addition to being heated directly by the heater units U, are also heated by their placement or presence in the chamber X, which chamber is heated by the heat energy issuing from the heater units which is not absorbed or conducted directly into the vessels. Accordingly, and since the heat within the chamber cannot escape from the insulated housing, a most effective and efficient use is made of the heat generated.

In the form of the invention illustrated in FIGURE 5 of the drawings, I have shown a third form of the invention wherein each vessel $V^2$ and its related heater unit $U^2$ are unitized in a novel manner.

The vessel $V^2$ illustrated is provided with a steel jacket 50 and a lead core 51 filling the chamber Z defined by the vessel and the said jacket.

The heater element $E^2$ includes a single elongate metal jacketed resistance wire, which element enters the rear end of the jacket and extends longitudinally and circumferentially, in a serpentine pattern, about the vessel and continues rearwardly from the rear end of the jacket.

The rearwardly projecting extensions $28^2$, outward of the jacket, are engaged and supported by a carrier block or body $29^2$, which block is similar to the carrier block in the other forms of the invention and has like parts related thereto.

The element is sealed with the jacket, where it projects through the wall of the jacket, by welding.

The neck $33^2$ of the vessel projects through the foremost wall of the jacket and is sealed therewith by welding.

The forward open end of the neck receives a nipple $40^2$, mounting plate $45^2$, similar to the nipple and mounting plate in the first form of the invention and has the several other parts found in the first form of the invention related to it.

In operation, the element $E^2$ which, for example, heats to 800° F., heats the vessel $V^2$, as in the first form of the invention. Secondly, it heats and melts the lead core 51, which melts at about 400° F., but which does not boil or vaporize until temperatures well in excess of 800° F. are reached.

The molten lead is, therefore, raised to a temperature of 800° F. and flows about and establishes intimate uninterrupted contact about the entire exterior surface of the vessel, assuring complete, uniform heating of the vessel.

The molten lead also serves as a heat sink or reservoir, so that upon the introduction of water into the vessel, adequate heat is stored so that the temperature drop experienced upon the introduction of water is maintained at a minimum and is, from a practical standpoint, eliminated.

Still further, when and if a portion of the vessel is cooled by the introduction of water therein, and the temperature of the adjacent portion of the molten lead core is cooled, convection currents are created or set up immediately in the molten lead, which currents move the lead and carry the heat energy stored thereby about the vessel and in such a manner that heat is effectively carried to the cool spots about the vessel. This function effectively overcomes the tendency of the vessel to cool at spots or areas and effectively maintains a uniform temperature throughout the entire extent of the vessel.

The jacket also becomes heated and the heat given up by the jacket is contained and directed back to the jacket and into the lead core, in the same or similar manner as in the first form of the invention and by means of a suitable insulated, sealed housing.

This form of the invention is, essentially, the same as the first form of the invention, but with the jacket and lead core added thereto.

It is to be understood that in practice the terminal ends of the heater elements can project forwardly in lateral spaced relationship from the necks of the vessels and their related nipples, without departing from the spirit of the invention, and that showing the terminals projecting rearwardly in the several forms of the invention illustrated was for the purpose of convenience only.

Having described only typical preferred forms and applications of my invention, I do not wish to be limited to the specific details herein set forth, but wish to reserve to myself any modifications and/or variations that may appear to those skilled in the art and which fall within the scope of the following claims.

Having described my invention I claim:

1. A steam generating of the character referred to including, an insulated housing with a front wall and defining a closed chamber, a plurality of elongate resistance heater units carried by the housing in spaced relationship in the chamber, a plurality of elongate steam vessels carried by the front wall and projecting rearwardly into the chamber and in supporting bearing engagement with the heater units, each vessel having a forwardly projecting neck, an elongate steam conducting nipple connected with the neck of each vessel and projecting forwardly and accessible at the exterior of the front wall, a shut-off valve with its inlet side connected with the forward end of the nipple and a steam manifold connected with the outlet side[s] of the several shut-off valves, and water supply means including an elongate tubular wand extending longitudinally into each vessel and through its related nipple, a spray nozzle at the rear end of the wand and in the rear end of the vessel, a riser connected with the forward end of the wand and accessible at the exterior of the nipple, outward of the housing, a flow control valve with its outlet side connected with the riser and a water main connected with the inlet side of the several flow control valves.

2. A steam generator of the character referred to including, an insulated housing with a front wall and defining a closed chamber, a plurality of elongate resistance heater units carried by the housing in spaced relationship in the chamber, a plurality of elongate steam vessels carried by the front wall and projecting rearwardly into the chamber and in supporting bearing engagement with the heater units, each vessel having a forwardly projecting neck, an elongate steam conducting nipple connected with the neck and projecting forwardly through the front wall, a check valve with its inlet connected with the forward end of the nipple, a shut-off valve with its inlet side connected with the outlet of the check valve and a steam manifold connected with the outlet side of the several shut-off valves, and water supply means including an elongate tubular wand extending longitudinally into each vessel and through its related nipple, a spray nozzle at the rear end of the wand in the rear end of the vessel, a riser connected with the forward end of the wand and accessible at the exterior of the nipple, outward of the housing, a check valve with its outlet connected with the riser, a flow control valve with its outlet connected with the inlet of the check valve and a water main connected with the inlet of the several control valves.

3. A steam generator of the character referred to including, an insulated housing with a front wall and defining a closed chamber, a plurality of elongate resistance heater units carried by the housing in spaced relationship in the chamber, a plurality of elongate steam vessels carried by the front wall and projecting rearwardly into the chamber and in supporting bearing engagement with the heater units, each vessel having a forwardly projecting neck, an elongate steam conducting nipple connected with the neck of each vessel and projecting forwardly through the front wall, a shut-off valve with its inlet side connected with the forward end of the nipple and a steam manifold connected with the outlet side of the several shut-off valves, and water supply means including an elongate tubular wand extending longitudinally into each vessel and through its related nipple, a spray nozzle at the rear end of the wand and in the rear end of the vessel, a riser connected with the forward end of the wand and accessible at the exterior of the nipple, outward of the housing, a flow control valve with its outlet connected with the riser and a water main connected with the inlet of the several flow control valves, said housing having outer walls, a lining of insulating material at and about the inner surfaces of the outer walls and a skin of reflective material on the inside surfaces of the lining.

4. A steam generator of the character referred to including, an insulated housing with a front wall and defining a closed chamber, a plurality of elongate resistance heater units carried by the housing in spaced relationship in the chamber, a plurality of elongate steam vessels carried by the front wall and projecting rearwardly into the chamber and in supporting bearing engagement with the heater units, each vessel having a forwardly projecting neck, an elongate steam conducting nipple connected with the neck and projecting forwardly through the front wall, a check valve with its inlet connected with the forward end of the nipple, a shut-off valve with its inlet connected with the outlet of the check valve and a steam manifold connected with the outlet of the several shut-off valves, and water supply means including an elongate tubular wand extending longitudinally into each vessel and through its related nipple, a spray nozzle at the rear end of the wand in the rear end of the vessel, a riser connected with the forward end of the wand and accessible at the exterior of the nipple, outward of the housing, a check valve with its outlet connected with the riser, a flow control valve with its outlet connected with the inlet of the check valve and a water main connected with the inlet of the several control valves, said housing having outer walls, a lining of insulating material at and about the inner surfaces of the outer walls and a skin of reflective material on the inside surfaces of the lining.

5. A steam generator of the character referred to including, an insulated housing with a front wall and defining a closed chamber, a plurality of elongate resistance heater units carried by the housing in spaced relationship in the chamber, a plurality of elongate steam vessels carried by the front wall and projecting rearwardly into the chamber and in supporting bearing engagement with the heater units, each vessel having a forwardly projecting neck, an elongate steam conducting nipple connected with the neck of each vessel and projecting forwardly through the front wall, a shut-off valve with its inlet side connected with the forward end of the nipple and a steam manifold connected with the outlet side of the several shut-off valves, and water supply means including an elongate tubular wand extending longitudinally into each vessel and through its related nipple, a spray nozzle at the rear end of the wand and in the rear end of the vessel, a riser connected with the forward end of the wand and accessible at the exterior of the nipple, outward of the housing, a flow control valve with its outlet connected with the riser and a water main connected with the inlet of the several flow control valves, each of said heater units including a mounting block engaged in an opening in a wall of the housing, an elongate metal jacketed resistance heater element fixed to and projecting from the block into the chamber and engaged about and extending longitudinally of the vessel related thereto, and terminal posts on the elements at the mounting blocks, accessible at the exterior of the housing and electrical conductors releasably connected with the terminal posts.

6. A steam generator of the character referred to including, an insulated housing with front and rear walls defining a closed chamber, a plurality of elongate resistance heater units carried by the rear wall in spaced relationship and projecting forwardly into the chamber, a plurality of elongate steam vessels carried by the front wall and projecting rearwardly into the chamber and in supporting bearing engagement with the heater units, each vessel having a forwardly projecting neck, an elongate steam conducting nipple connected with the neck and projecting forwardly through the front wall, a check valve with its inlet connected with the forward end of the nipple, a shut-off valve with its inlet connected with the outlet of the check valve and a steam manifold connected with the outlet of the several shut-off valves, and water supply means including an elongate tubular wand extending longitudinally into each vessel and through its related nipple, a spray nozzle at the rear end of the wand in the rear end of the vessel, a riser connected with the forward end of the wand and accessible at the exterior of the nipple, outward of the housing, a check valve with its outlet connected with the riser, a flow control valve with its outlet connected with the inlet of the check valve and a water main connected with the inlet of the several control valves, each of said heater units including a mounting block engaged in an opening in the rear wall of the housing, an elongate metal jacketed resistance heater element fixed to and projecting forwardly from the block and engageable about and extending longitudinally of the vessel related thereto, and rearwardly projecting terminal posts on the elements, accessible at the rear of the housing and electrical conductors releaseably connected with the terminal posts of the several units.

7. A steam generator of the character referred to including, an insulated housing with front and rear walls defining a closed chamber, a plurality of elongate resistance heater units carried by the rear wall in spaced relationship and projecting forwardly into the chamber, a plurality of elongate steam vessels carried by the front wall and projecting rearwardly into the chamber and in supporting bearing engagement with the heater units, each vessel having a forwardly projecting neck, an elongate steam conducting nipple connected with the neck of each vessel and projecting forwardly through the front wall, a shut-off valve with its inlet side connected with the forward end of the nipple and a steam manifold connected with the outlet side of the several shut-off valves, and water supply means including an elongate tubular wand extending longitudinally into each vessel and through its related nipple, a spray nozzle at the rear end of the wand and in the rear end of the vessel, a riser connected with the forward end of the wand and accessible at the exterior of the nipple, outward of the housing, a flow control valve with its outlet connected with the riser and a water main connected with the inlet of the several flow control valves, each of said heater units including a pair of elongate split loop, metal jacketed resistance heater elements with longitudinal vessel engaging rail portions and rearwardly projecting end portions, mounting blocks engaging and supporting the end portions of the elements and engaged and supported in openings in the rear wall of the housing, terminal posts projecting rearwardly from the end portions of the elements and electrical conductors at the rear of the housing and engaging the terminal posts.

8. A steam generator of the character referred to including, an insulated housing with front and rear walls defining a closed chamber, a plurality of elongate resistance heater units carried by the rear wall in spaced relationship and projecting forwardly into the chamber, a plurality of elongate steam vessels carried by the front wall and projecting rearwardly into the chamber and in supporting bearing engagement with the heater units, each vessel having a forwardly projecting neck, an elongate steam conducting nipple connected with the neck and projecting forwardly through the front wall, a check valve with its inlet connected with the forward end of the nipple, a shut-off valve with its inlet connected with the outlet of the check valve and a steam manifold connected with the outlet of the several shut-off valves, and water supply means including an elongate tubular wand extending longitudinally into each vessel and through its related nipple, a spray nozzle at the rear end of the wand in the rear end of the vessel, a riser connected with the forward end of the wand and accessible at the exterior of the nipple, outward of the housing, a check valve with its outlet connected with the riser, a flow control valve with its outlet connected with the inlet of the check valve and a water main connected with the inlet of the several control valves, each of said heater units including a pair of elongate split loop, metal jacketed resistance heater elements with longitudinal vessel engaging rail portions and rearwardly projecting end portions with rearwardly projecting terminal posts, mounting blocks engaging and supporting the end portions of the elements and engaged and supported in openings in the rear wall of the housing, and electric conductors at the rear of the housing and engaging the terminal posts.

9. A steam generator of the character referred to including, an insulated housing with front and rear walls defining a closed chamber, a plurality of elongate resistance heater units carried by the rear wall in spaced relationship and projecting forwardly into the chamber, a plurality of elongate steam vessels carried by the front wall and projecting rearwardly into the chamber and in supporting bearing engagement with the heater units, each vessel having a forwardly projecting neck, an elongate steam conducting nipple connected with the neck of each vessel and projecting forwardly through the front wall, a shut-off valve with its inlet side connected with the forward end of the nipple and a steam manifold connected with the outlet side of the several shut-off valves, and water supply means including an elongate tubular wand extending longitudinally into each vessel and through its related nipple, a spray nozzle at the rear end of the wand and in the rear end of the vessel, a riser connected with the forward end of the wand and accessible at the exterior of the nipple, outward of the housing, a flow control valve with its outlet connected with the riser and a water main connected with the inlet of the several flow control valves, said housing having outer walls, a lining of insulating material at and about the inner surfaces of the outer walls and a skin of reflective material on the inside surfaces of the lining, each of said heater units including a mounting block engaged in an opening in the rear wall of the housing, an elongate metal jacketed resistance heater element fixed to and projecting forwardly from the block and engageable about and extending longitudinally the walls of the vessel related thereto, and rearwardly projecting terminal posts on the elements, accessible at the rear of the housing and electrical conductors releasably connected with the terminal posts.

10. A steam generator of the character referred to including, an insulated housing with a front wall and defining a closed chamber, a plurality of elongate horizontally disposed steam vessels with forwardly projecting necks and with metal jacketed resistance heater elements with outwardly projecting terminal posts about their exteriors arranged in spaced relationship in the chamber and extending rearwardly from the front wall with the neck projecting through and accessible at the exterior of the front wall and with the terminals projecting through a wall of and accessible at the exterior of the housing, steam conducting means at the front of the housing and connected with the several necks to conduct steam generated in the vessels therefrom, water supply means related to the necks of the several vessels adjacent to the steam conducting means and extending through the necks and into the vessels to introduce water into the vessels and electric power supply means at the rear of the housing and connected with the terminals.

11. A steam generator of the character referred to including, an insulated housing with front and rear walls defining a closed chamber, a plurality of elongate horizontally disposed steam vessels with forwardly projecting necks and with metal jacketed resistance heater elements with rearwardly projecting terminal posts about their exteriors arranged in spaced relationship in the chamber and extending between the front and rear walls with the neck projecting through and accessible at the exterior of the front wall and with the terminals projecting through and accessible at the exterior of the rear walls, steam conducting means at the front of the housing and connected with the several necks to conduct steam generated in the vessels therefrom, water supply means adjacent to the steam conducting means and extending through the necks and into the interiors of the vessels to introduce water into the vessels and electric power supply means at the rear of the housing and connected with the terminals, said vessels having jackets in spaced relationship about their exteriors and about the heater elements and lead cores in the spaces defined by the jackets and vessels and through which the elements extend.

12. A steam generator of the character referred to including, an insulated housing with front and rear walls defining a closed chamber, a plurality of elongate horizontally disposed steam vessels with forwardly projecting necks and with metal jacketed resistance heater elements with rearwardly projecting terminal posts about their exteriors arranged in spaced relationship in the chamber and extending between the front and rear walls with the neck projecting through and accessible at the exterior of the front wall and with the terminals projecting through and accessible at the exterior of the rear walls, steam conducting means at the front of the housing and connected with the several necks to conduct steam generated in the vessels therefrom, water supply means adjacent to the steam conducting means and extending through the necks of the vessels to introduce water into the vessels and electric power supply means at the rear of the housing and connected with the terminals, each of said vessels having a jacket in spaced relationship about its exterior and about the heater element and a lead core in the space defined by the jacket and core and through which the elements extend, said jacket having an apertured rear end portion through which the rear end portions of the elements extend in sealed relationship therewith and a front end portion through which the forward portion of the vessel projects in sealed relationship therewith.

13. A steam generator of the character referred to including, an insulated housing with front and rear walls defining a closed chamber, a plurality of elongate resistance heater units carried by the rear wall in spaced relationship and projecting forwardly into the chamber, a plurality of elongate steam vessels carried by the front wall and projecting rearwardly into the chamber and in supporting bearing engagement with the heater units, each vessel having a forwardly projecting neck, an elongate steam conducting nipple connected with the neck and projecting forwardly through the front wall, a check valve with its inlet connected with the forward end of the nipple, a shut-off valve with its inlet connected with the outlet of the check valve and a steam manifold connected with the outlet of the several shut-off valves, and water supply means including an elongate tubular wand extending longitudinally into each vessel and through its related nipple, a spray nozzle at the rear end of the wand in the rear end of the vessel, a riser connected with the forward end of the wand and accessible at the exterior of the nipple, outward of the housing, a check valve with its outlet connected with the riser, a flow control valve with its outlet connected with the inlet of the check valve and a water main connected with the inlet of the several control valves, said housing having outer walls, a lining of insulating material at and about the inner surfaces of the outer walls and a skin of reflective material on the inside surfaces of the lining, each of said heater units including a mounting block engaged in an opening in the rear wall of the housing, an elongate metal jacketed resistance heater element fixed to and projecting forwardly from the block and engageable about and extending longitudinally of the vessel related thereto, rearwardly projecting terminal posts on the elements accessible at the rear of the housing and electrical conductors releaseably connected with the terminal posts.

14. A steam generator of the character referred to including, an insulated housing with front and rear walls defining a closed chamber, a plurality of elongate resistance heater units carried by the rear wall in spaced relationship and projecting forwardly into the chamber, a plurality of elongate steam vessels carried by the front wall and projecting rearwardly into the chamber and in supporting bearing engagement with the heater units, each vessel having a forwardly projecting neck, an elongate steam conducting nipple connected with the neck of each vessel and projecting forwardly through the front wall, a shut-off valve with its inlet side connected with the forward end of the nipple and a steam manifold connected with the outlet side of the several shut-off valves, and water supply means including an elongate tubular wand extending longitudinally into each vessel and through its related nipple, a spray nozzle at the rear end of the wand and in the rear end of the vessel, a riser connected with the forward end of the wand and accessible at the exterior of the nipple, outward of the housing, a flow control valve with its outlet connected with the riser and a water main connected with the inlet of the several flow control valves, said housing having outer walls, a lining of insulatng material at and about the inner surfaces of the outer walls and a skin of reflective material on the inside surfaces of the lining, each of said heater units including a pair of elongate split loop, metal jacketed resistance heater elements with longitudinal vessel engaging rail portions, rearwardly projecting end portions with rearwardly projecting terminal posts, mounting blocks engaging and supporting the end portions and engaged and supported in openings in the rear wall of the housing, and electrical conductors at the rear of the housing and engaging the terminal posts.

15. A steam generator of the character referred to including, an insulated housing with front and rear walls defining a closed chamber, a plurality of elongate resistance heater units carried by one of the walls in spaced relationship and projecting longitudinally through the chamber, a plurality of elongate steam vessels carried by one of the walls and projecting longitudinally through the chamber and in engagement with the heater units, each vessel having an axially outwardly projecting neck at one end, an elongate steam conducting nipple connected with the neck and projecting through the adjacent wall, a check valve with its inlet connected with the free end of the nipple, a shut-off valve with its inlet connected with the outlet of the check valve and a steam manifold connected with the outlet of the several shut-off valves, and water supply means including an elongate tubular wand extending through the nipple and communicating with the interior of each vessel, and having a free end accessible at the exterior of the housing, a check valve with its outlet connected with the inlet of the wand, a control valve connected with the inlet of the check valve and a water main connected with the inlets of the several control valves.

References Cited

UNITED STATES PATENTS

| | | | |
|---|---|---|---|
| 734,871 | 7/1903 | Hopwood et al. | 122—40 |
| 1,475,589 | 11/1923 | Marden | 122—41 X |
| 2,753,212 | 7/1956 | Aultman | 239—137 |

RICHARD M. WOOD, *Primary Examiner.*

C. L. ALBRITTON, *Assistant Examiner.*